(12) United States Patent
Meyerhoff et al.

(10) Patent No.: US 12,328,277 B2
(45) Date of Patent: Jun. 10, 2025

(54) METHOD AND SYSTEM FOR ESTIMATING A TRANSMISSION CHANNEL OF A COMMUNICATION LINK

(71) Applicant: Airbus (S.A.S.), Blagnac (FR)

(72) Inventors: Thomas Meyerhoff, Hamburg (DE); Martin Kasparick, Blagnac (FR); Dennis Wieruch, Blagnac (FR)

(73) Assignee: Airbus (S.A.S.), Blagnac (FR)

( * ) Notice: Subject to any disclaimer, the term of this patent is extended or adjusted under 35 U.S.C. 154(b) by 326 days.

(21) Appl. No.: 17/835,657

(22) Filed: Jun. 8, 2022

(65) Prior Publication Data

US 2022/0399972 A1 Dec. 15, 2022

(30) Foreign Application Priority Data

Jun. 11, 2021 (EP) ..................... 21179054

(51) Int. Cl.
*H04L 5/00* (2006.01)

(52) U.S. Cl.
CPC .......... *H04L 5/0048* (2013.01); *H04L 5/0007* (2013.01); *H04L 5/0073* (2013.01)

(58) Field of Classification Search
None
See application file for complete search history.

(56) References Cited

U.S. PATENT DOCUMENTS

| | | | | |
|---|---|---|---|---|
| 2005/0207334 A1* | 9/2005 | Hadad | ................. | H04L 27/2657 370/350 |
| 2007/0217530 A1* | 9/2007 | Hosseinian | ......... | H04L 25/0228 375/260 |
| 2009/0060090 A1* | 3/2009 | Ban | ..................... | H04L 27/2613 375/329 |
| 2009/0221254 A1* | 9/2009 | Kawauchi | ............ | H04B 1/1036 455/296 |
| 2009/0232257 A1* | 9/2009 | Bury | ................... | H04L 27/2672 375/344 |
| 2012/0116753 A1* | 5/2012 | Strandh | ................ | H04B 15/005 704/203 |

(Continued)

OTHER PUBLICATIONS

European Search Report for Application No. 21179054 dated Nov. 19, 2021.

*Primary Examiner* — Brandon M Renner
(74) *Attorney, Agent, or Firm* — KDW Firm PLLC

(57) ABSTRACT

A system and a method for estimating a transmission channel of a communication link. A transmitter can transmit a first transmission signal and a receiver can receive the first transmission signal through the transmission channel. The first transmission signal includes data elements and pilots, each of the pilots being located at specified locations within a time-frequency domain of the first transmission signal. The receiver can determine a level of interference for each of the pilots, the level of interference being indicative of an extent of distortion on a respective pilot caused by a second transmission signal interfering with the first transmission signal. The receiver can further determine an interference-mitigated pilot for each pilot based on the determined level of interference determined for each respective pilot. The receiver can use the determined interference-mitigated pilots to estimate the transmission channel of the first transmission signal.

10 Claims, 3 Drawing Sheets

(56) References Cited

U.S. PATENT DOCUMENTS

| | | | |
|---|---|---|---|
| 2012/0320729 A1* | 12/2012 | Jung | H04L 25/0232 |
| | | | 370/201 |
| 2018/0248592 A1* | 8/2018 | Ashrafi | H04L 5/0048 |
| 2018/0262802 A1* | 9/2018 | Amimoto | H04N 21/42607 |
| 2021/0022007 A1* | 1/2021 | McFadden | H04W 28/26 |
| 2021/0075562 A1* | 3/2021 | Babich | H04L 25/03006 |
| 2021/0344439 A1* | 11/2021 | Kuchi | H04B 17/336 |
| 2022/0038112 A1* | 2/2022 | Kee | H03M 1/1245 |
| 2024/0205696 A1* | 6/2024 | Gutman | H03F 1/3247 |

\* cited by examiner

METHOD AND SYSTEM FOR ESTIMATING A TRANSMISSION CHANNEL OF A COMMUNICATION LINK

CROSS-REFERENCE TO RELATED APPLICATION

This application claims priority to EP 21179054.8 filed Jun. 11, 2021, the entire disclosure of which is incorporated by reference herein.

TECHNICAL FIELD

The disclosure herein relates to interference mitigation for enhanced channel estimation of communication links. In particular, the disclosure herein relates to a method for estimating a transmission channel of a communication link and a system for estimating a transmission channel of a communication link.

BACKGROUND

Wireless communication technologies require knowledge about the wireless channel via which the communication is established, so that successful coherent communication can be performed. Therefore, most systems embed pilots within the communication signal, so that based on these pilots the wireless channel can be estimated at a receiver that receives the corresponding communication signal. Wireless communication technologies are for example Wi-Fi 6 by IEEE (IEEE80211ax) as well as LTE and New Radio (NR) by 3GPP (3GPP36201, 3GPP38201). While Wi-Fi 6 represents a packet-oriented communication system, where the pilots are used to equalize the receive signal of a packet, 3GPP technologies embed the pilots into a signal stream and the receiver estimates the channel continuously. Other wireless technologies like IEEE 802.15.4, Bluetooth and DECT estimate the wireless channel in a similar way. In the stream and packet-based approaches, pilots are used to estimate the channel. Therefore, noise and interference impacting the reception of the pilots significantly affects the performance of channel estimation and equalization procedures, and thus also the bit errors of the data transmission in which these pilots are located.

SUMMARY

It may be seen as an object of the disclosure herein to improve channel estimation of a communication link.

A method and a system are disclosed herein along with example embodiments of the disclosure herein.

According to an aspect of the disclosure herein, a method for estimating a transmission channel of a communication link is provided. In a step of the method, a first transmission signal is received through the transmission channel, wherein the first transmission signal includes a plurality of data elements and a plurality of pilots, each of the plurality of pilots being located at specified locations within a time-frequency domain of the first transmission signal. In another step, a level of interference for at least some or for each of the plurality of pilots is determined, the level of interference being indicative of an extent of distortion on a respective pilot caused by a second transmission signal interfering with the first transmission signal. In a further step of the method, an interference-mitigated pilot is determined for each pilot based on the determined level of interference determined for each respective pilot. In a further step, the determined interference-mitigated pilots are used to estimate the transmission channel of the first transmission signal. The method steps may be performed in the indicated order.

The disclosure herein provides a procedure to locally mitigate interference among different signals, and therefore enhance the channel estimation process required for coherent data reception. The result is a higher throughput and reliability of wireless transmission, for example in interference scenarios including frequency modulated continuous waves (FMCW). Such scenarios may occur when different signals, e.g., a first transmission signal and a second transmission signal are simultaneously present, and one of these signals interferes with the other signal. For example, there may be the first transmission signal that transfers data content and the second transmission signal that includes a frequency modulated signal like a chirp signal.

The interference of the second transmission signal with the first transmission signal leads to distortions of the pilots embedded in the time-frequency domain of the first transmission signal. There exist scenarios in which the disturbance, which leads to the distortions of the pilots of the first transmission signal, is different for each pilot due to the appearance of the interfering second transmission signal. One distinct scenario may represent an interference scenario with radar systems like FMCW radio altimeters or the above-mentioned chirp signals. In particular, if a wireless communication system (first transmission signal) shares its spectrum band with FMCW radio altimeters (second transmission signal), some pilots of the first transmission signal will be interfered depending on their position in the time-frequency domain of the first transmission signal. Therefore, pilots in a received signal at distant time and frequency positions are affected differently by this type of interference. The disclosure herein provides a possibility to mitigate this interference in order to enhance the channel estimation procedure, for example using interference as an additional input. Therefore, independent of the distinct underlying technology, a channel estimation process may use the pilots depending on their grade/level of disturbance to derive a high-quality channel estimate for equalizing the received signal at data symbol locations.

As indicated above, the first transmission signal includes a plurality of data elements and a plurality of pilots. The data elements may comprise the data to be transmitted via the communication link. The communication link may be a wireless communication link and the first transmission signal may thus be a wireless signal sent from a transmitter to a receiver. Each of the plurality of pilots is located at specified locations within a time-frequency domain of the first transmission signal. In other words, the pilots may be embedded in an arbitrary manner in the time-frequency domain of the first transmission signal. The pilots or pilot symbols within the first transmission signal, as they are received by the receiver, can be used to assess the quality of the transmission between the transmitter and the receiver, i.e., to estimate the transmission channel.

The quality of the received first transmission signal may be dependent on a level of interference that each of the pilots is subjected to during interference with the second transmission signal. This level of interference for each pilot is determined, wherein the level of interference is indicative of an extent of distortion on a respective pilot caused by the second transmission signal which interferes with the first transmission signal. It is possible that each or some of the pilots in the first transmission signal experience a different distortion by the interference. However, there may be pilots that are hardly or not distorted.

Afterwards, an interference-mitigated pilot is determined for each pilot based on the level of interference determined for each respective pilot. This means that a distortion may be measured or calculated for each pilot in the first transmission signal such that for each pilot one respective interference-mitigated pilot can be determined. The interference-mitigated pilot may be based on the grade/level of distortion of the respective pilots that is used afterwards to determine whether and/or to what extend the pilot contributes to the estimation of the transmission channel of the first transmission signal.

At the receiver, these interference-mitigated pilots may be used to estimate the wireless channel for the established transmission link and equalize the receive signal. To acquire the channel information between pilot symbols, different estimation algorithms may be applied. One option linearly interpolates the channel on the data symbols/elements between pilot symbols in the time-frequency domain. However, other interpolation techniques may be applied, which exploit certain structures of the transmission channel, such as sparsity induced by multipath propagation of the transmission signal.

According to an embodiment, the level of interference is indicative of an extent of distortion on a respective pilot caused by the second transmission signal interfering with only a portion of the first transmission signal.

This means that there might only be a portion of the first transmission signal experiencing an interference with the second transmission signal. This might be due to the appearance of the second transmission signal that, for example, is present in the form of a chirp signal.

According to an embodiment, the first transmission signal is based on orthogonal frequency-division multiplexing (OFDM), wherein the first transmission signal comprises multiple OFDM-symbols at respective time steps and multiple OFDM-subcarriers at respective subcarrier frequencies.

OFDM is a type of digital transmission in which digital data is encoded on multiple carrier frequencies, i.e., the subcarrier frequencies. Multiple of these subcarrier frequencies may form an OFDM-symbol for a specified time step.

According to an embodiment, the second transmission signal is a frequency-modulated signal having an instantaneous bandwidth less than a bandwidth of the first transmission signal.

In particular, the second transmission signal is a frequency-modulated signal which, at least within certain time instances or time intervals, has a bandwidth less than the bandwidth of the first transmission signal.

According to an embodiment, the second transmission signal is a chirp signal.

For example, FMCW altimeters may generate such chirp signals (compressed high intensity radar signals). A chirp signal is a continuous wave where the frequency continuously changes over time. The up-chirp denotes the phase where the frequency increases from $f_{min}$ to $f_{max}$ and the down-chip denotes the phase where the frequency decreases from $f_{max}$ to $f_{min}$. When observing a short time interval, a chirp signal is relatively narrowband. The narrowband property of FMCW pulses depends on the observed time. The longer the observation time, the larger the occupied bandwidth.

According to an embodiment, determining the level of interference for each of the plurality of pilots includes determining an amplitude and a phase of the first transmission signal.

Before determining the level of interference, the pilots can be demapped from the time-frequency domain, i.e., their locations in the time-frequency domain may be determined. Afterwards, in order to mitigate interference for each pilot individually, the grade/level of interference is measured. Different approaches can be applied to determine or calculate the level of interference on each pilot that is representative for a distortion on the respective pilot caused by the second transmission signal interfering with the first transmission signal in which the pilots are embedded. Three different approaches are presented in more detail herein, however, it is understood that further approaches can be applied.

For high power interferers, one option to measure the interference on the pilots is the use of the magnitude, which can be given as the actual pilot magnitude or pilot power. The magnitude is measured on the received pilots. This approach might be preferred if the pilots are based on phase-shift keying like QPSK (quadrature phase-shift keying) where the amplitude of the transmitted pilots is constant. Then, a measure $\epsilon_{t,f}$ of the distortion at time t and frequency f can be obtained by $$\epsilon_{t,f} = |y_{t,f}|^a,$$

where $a \in \mathbb{R}$ can be generally set to a=2, and $y_{t,f}$ represents the pilot symbol at time t and frequency f.

Given the root mean square (RMS) on vector y, where y contains symbols (or just pilots) within given coherence time and bandwidth, the normalized distortion is given by the ratio $$\hat{\epsilon}_{t,f} = \frac{|y_{t,f}|^a}{\text{rms}(y)^a} = \frac{\text{absolute symbol value}}{\text{RMS of selected symbols}}$$

According to an embodiment, determining the level of interference for each of the plurality of pilots includes obtaining an estimation parameter for the transmission channel, determining a distortion for each pilot in the first transmission signal and determining a deviation value for each pilot based on the estimation parameter and the determined distortion for each pilot.

This option to determine the interference level in the form of a pilot deviation may be applied if further information like the estimation parameter is available. This information can then be used to obtain the deviation between the received pilot and the channel to the transmitter. The deviation represents the distortion of the pilot. The estimation parameter, herein also simply referred to as estimate, for the true channel can be obtained via different methods. One option to estimate the true channel is to average the pilot symbols within given coherent time and bandwidth, i.e.

$$\overline{y_{t,f}} = \frac{1}{(T_2-T_1)(F_2-F_1)} \sum_{n=T_1}^{T_2} \sum_{k=F_1}^{F_2} y_{t+n,f+k}.$$

where $T_1$ denotes a first time and $T_2$ denotes a second time, and where $F_1$ denotes a first frequency and $F_2$ denotes a second frequency. For example, f+k denotes an index or center frequency of a sub carrier in an OFDM symbol at a time t+n. Thus, the local distortions, e.g., SIR (signal-to-interference ratio) estimates, can be obtained by $$\epsilon_{t,f} = (y_{t,f} - \overline{y_{t,f}})^a$$

where $y_{t,f}$ represents the pilot symbol at time t and frequency f. Similar to the determination of the pilot power, $a \in \mathbb{R}$ can be generally set a=2. However, depending on the application, other exponents may be more appropriate. $\overline{y_{t,f}}$ represents the averaged pilot symbol. The normalized distortion based on the deviation is given by $$\epsilon_{t,f} = \frac{(y_{t,f} - \overline{y_{t,f}})^a}{(\overline{y_{t,f}})^a} = \frac{\text{absolute symbol error}}{\text{averaged symbol}}.$$

The relation between the magnitude/deviation and the distortion may be a linear relation or a non-linear relation. Corresponding mathematical equations may be applied. Therefore, a linear mapping between the magnitude/deviation and the distortion but also non-linear mapping can be used.

One option to apply non-linear mapping to determine the interference level for the pilots is a logistic function as follows:

$$g(x; x_0) = \frac{1}{1 + e^{-k(x - x_0)}}.$$

Where x refers to a measurement and $x_0$ denotes the zero crossing on the x-axis in a reference coordinate system. For values x below $x_0$, the logistic function quickly converges to zero. For values x above $x_0$, the logistic function quickly converges to one. The factor k controls the convergence rate, i.e., how fast the transition from zero to one takes place. The corresponding logistic function can be used to calculate a local distortion estimate based on the magnitude with $$\epsilon_{t,f} = \frac{1}{g(-|y_{t,f}|^a; -(\text{rms}(y))^a)} - 1 = e^{k(|y_{t,f}|^a - (\text{rms}(y))^a)},$$

where $a \in \mathbb{R}$ can be generally set to a=2, $g(\cdot;\cdot)$ is the logistic function defined above and rms(y) represents the root mean square on vector y, where y contains symbols (or just pilots) within given coherence time and bandwidth.

In a similar way, the logistic function $g(\cdot;\cdot)$ can be applied to calculate a local distortion estimate based on the deviation with $$\epsilon_{t,f} = \frac{1}{g(-(y_{t,f} - \overline{y_{t,f}})^a; -\sigma^a)} - 1 = e^{k((y_{t,f} - \overline{y_{t,f}})^a - \sigma^a)},$$

where $a \in \mathbb{R}$ can be generally set to a=2, and $\sigma^2$ represents the noise variance. $\overline{y_{t,f}}$ represents the averaged pilot symbol as defined above.

Based on the measured interference level, the interference can now be mitigated for each pilot individually. Different approaches can be used here as well. In the following, two different approaches will be described in further detail. The first approach is a blanking operation in which pilots or complete OFDM-symbols are omitted based on their specific distortion. The second approach is a smoothing operation in which pilots are further considered based on a local SIR estimation.

According to an embodiment, determining the interference-mitigated pilots includes discarding/omitting one or more of the pilots that are determined to have an extent of distortion above a threshold extent of distortion.

In other words, pilots experiencing a too high interference by the second transmission signal are distorted in such a manner that these pilots are not suitable any more to be used for estimating the transmission channel.

Therefore, such distorted pilots will be omitted from consideration.

According to an embodiment, determining the interference-mitigated pilots includes discarding all pilots of those OFDM-symbols that include at least one pilot determined to have an extent of distortion above a threshold extent of distortion.

In this case, a pilot blanking is performed in which one or more complete OFDM-symbol experiencing an interference are omitted.

The above-given examples for the blanking operation will be described in more detail in the description of the Figures below.

According to an embodiment, determining the interference-mitigated pilots includes adapting an influence for each pilot, the adapted influence being indicative of an impact of the respective pilot on estimating the transmission channel of the first transmission signal.

In contrast, to the blanking operation, this smoothing operation will consider the interfered pilots and/or neighboring pilots of interfered pilots based on their respective distortion. Such smoothing approaches mitigate the interference by suppressing the impact of interfered pilots on the channel estimation process in relation to their distortion. Time-smoothing operations as well as neighbor smoothing operations may be performed. While time smoothing is utilizing only the time domain for mitigation, neighbor smoothing also utilizes the frequency domain. These aspects for the smoothing operation will also be described in more detail in the description of the figures below.

A third approach for determining the interference-mitigated pilots in a given frequency interval F1 to F2, is to order local distortion estimates in a time interval T1 to T2 based on the magnitude and/or phase, and then select e.g. a pilot symbol at or close to the median or x percentile magnitude value to be used as interference-mitigated pilot.

According to an aspect, a system for estimating a transmission channel of a communication link is provided. The system comprises a transmitter configured to transmit a first transmission signal and a receiver configured to receive the first transmission signal through the transmission channel. The first transmission signal includes a plurality of data elements and a plurality of pilots, each of the plurality of pilots being located at specified locations within a time-frequency domain of the first transmission signal. The receiver is configured to determine a level of interference for each of the plurality of pilots, the level of interference being indicative of an extent of distortion on a respective pilot caused by a second transmission signal interfering with the first transmission signal. The receiver is configured to determine an interference-mitigated pilot for each pilot based on the determined level of interference determined for each respective pilot. The receiver is further configured to use the determined interference-mitigated pilots to estimate the transmission channel of the first transmission signal.

All features described in the context of the inventive method above may also apply to the features described in the context of the system.

BRIEF DESCRIPTION OF THE DRAWINGS

The disclosure herein will hereinafter be described in conjunction with the following drawing figures, wherein like numerals denote like elements.

DETAILED DESCRIPTION

Figure 1:
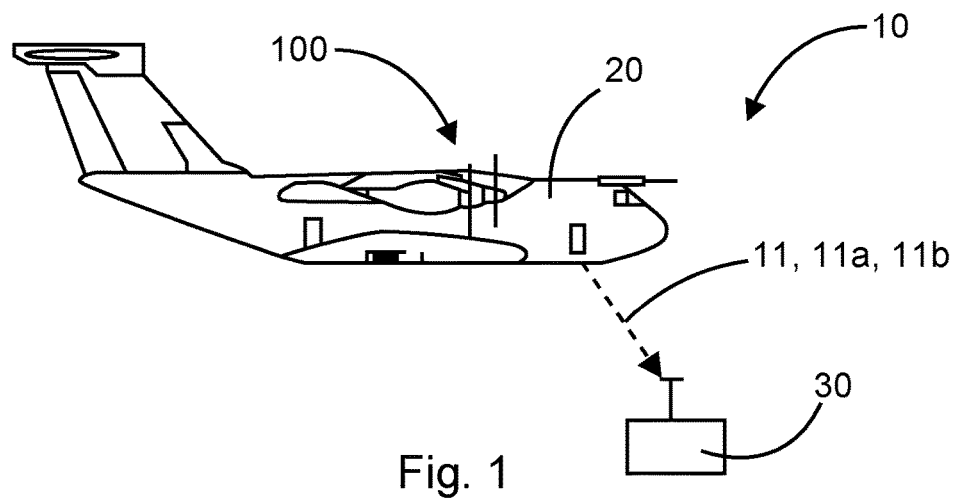
FIG. 1 shows a signal transmission via a communication link in a system according to an example embodiment.

The representations and illustrations in the drawings are schematic and not to scale. A better understanding of the method and system described above may be obtained through a review of the illustrations accompanying this application together with a review of the detailed description that follows.

FIG. 1 shows a signal transmission via a communication link 11 in a system 10. The system 10 is configured for estimating a transmission channel of the communication link 11. The system 10 comprises a transmitter 20, which in this example embodiment is a communication unit of an aircraft 100. The transmitter 20 is configured to transmit a first transmission signal 11a. The system further comprises a receiver 30, for example a ground communication unit, configured to receive the first transmission signal 11a through the established transmission channel. The communication link 11 is thus a wireless transmission link between the transmitter 20 and the receiver 30. It is noted that both the transmitter 20 and the receiver 30 may be located on board the aircraft.

Figure 2:
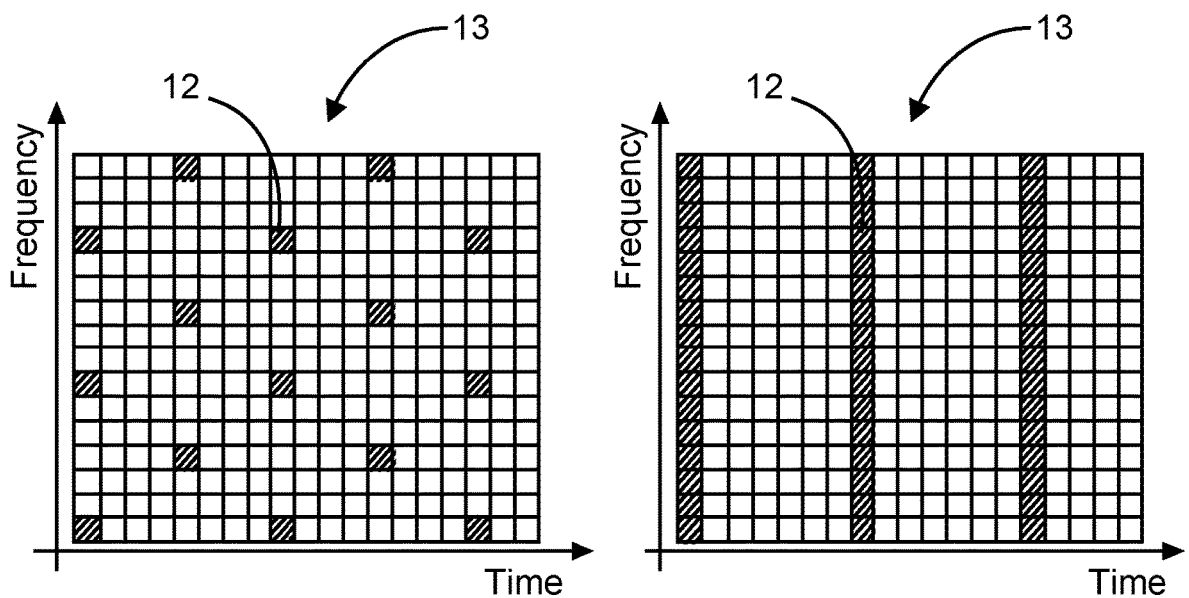
FIG. 2 shows two different arrangements of pilots within a time-frequency domain of a first transmission signal according to an example embodiment.

The first transmission signal 11a includes a plurality of data elements and a plurality of pilots, each of the plurality of pilots being located at specified locations within a time-frequency domain 13 as exemplarily shown in FIG. 2.

The receiver 30 is configured to determine a level of interference for each of the plurality of pilots, the level of interference being indicative of an extent of distortion on a respective pilot caused by a second transmission signal 11b interfering with the first transmission signal 11a. Such an interference leading to a distortion of the pilots is exemplarily shown in FIGS. 4 to 7 and will be explained hereinafter.

The receiver 30 is further configured to determine an interference-mitigated pilot for each pilot based on the determined level of interference determined for each respective pilot.

FIG. 2 shows two different arrangements of pilots 12 within a time-frequency domain 13 of a transmission signal, for example the first transmission signal 11a shown in FIG. 1. Given an OFDM-system, the pilots 12 or pilot symbols 12 can be distributed among the time-frequency grid or a whole OFDM-symbol is completely equipped with pilots 12. Both arrangements are shown in FIG. 2. It is possible that a mixed version of the example depicted pilot arrangements of FIG. 2 is present, as for example in a system like IEEE 802.11 and 3GPP LTE/NR.

Figure 3:
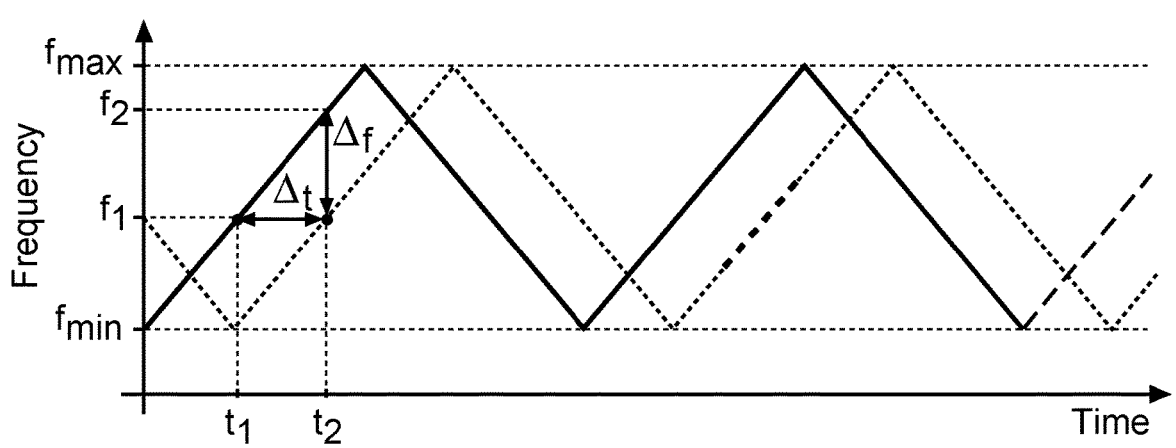
FIG. 3 shows a second transmission signal according to an example embodiment.

FIG. 3 shows the second transmission signal 11b of FIG. 1, which in this example embodiment particularly appears as a narrowband sweep of an FMCW radio altimeter within a frequency band over the time. Such signals 11b are typically allocated to radar systems like the FMCW radio altimeters. The interfering radar system thus radiates the first transmission signal 11a (cf. FIG. 1) on confined parts of the time-frequency domain.

Figure 4:
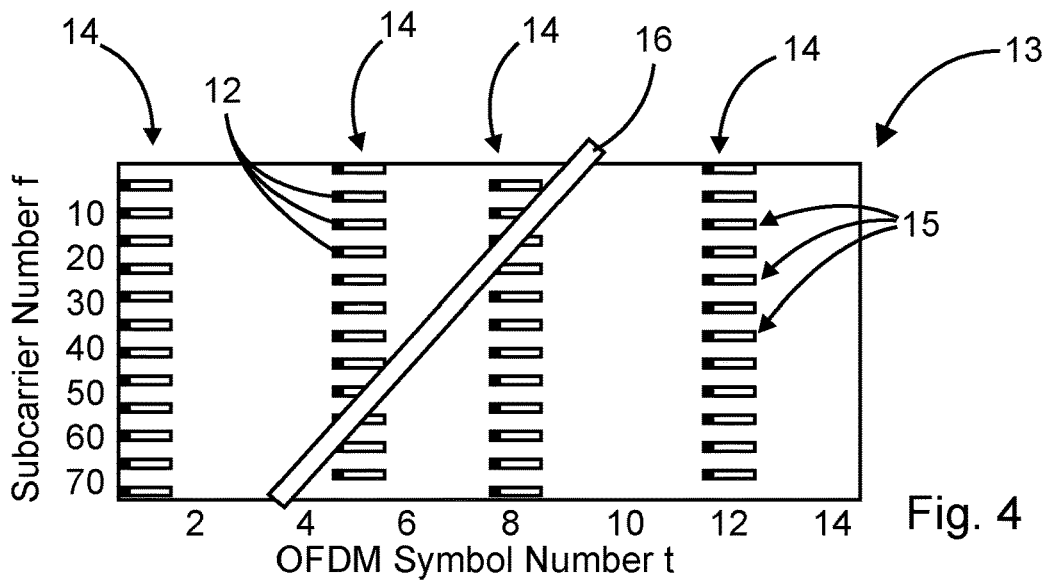
FIG. 4 shows pilots in a resource grid of a first transmission signal interfered by a second signal according to an example embodiment.

FIG. 4 shows as an example pilots 12 in a resource grid of a transmission signal for example used for wireless avionics intra-communications (WAIC), which for example is the first transmission signal 11a shown in FIG. 1, interfered by a second signal, which for example is the second transmission signal 11b shown in FIG. 1. As can be seen in FIG. 4, the resource grid shows at least a part of a time-frequency domain 13 of the first transmission signal 11a. The first transmission signal comprises multiple OFDM-symbols 14 being located at respective time steps within the time-frequency domain 13. The first transmission signal 11a further comprises multiple OFDM-subcarriers 15 also being located at respective subcarrier frequencies within the time-frequency domain. Pilots 12 (three are referenced in FIG. 4) may be arbitrarily distributed within the time-frequency domain, in particular, at different OFDM-subcarriers 15. Possible distributions of pilots 12 are shown in FIG. 2 above. An interfering signal 16, which for example is the second transmission signal 11b shown in FIG. 1, more or less interferes with the pilots 12 or at least some of the pilots 12 depending on their position in the time-frequency domain 13 shown in FIG. 4. It is derivable from FIG. 4 that only some of the pilots are interfered and thus distorted due to the appearance or form of the interfering transmission signal 16. The extent of distortion among the pilots 12 in the time-frequency domain 13 is therefore different. In other words, each pilot 12 experiences a distinct distortion by the interference that is determined as described herein. After determining this level of interference of each of the pilots or at least a part of the pilots in the time-frequency domain 13, interference-mitigated pilots for the pilots 12 are determined based on the respectively determined levels of interference of these pilots 12. The interference-mitigated pilots may represent parameters, values, scalars, etc. that provide an indication of the distortion of each respective pilot 12 in the time-frequency domain 13.

Figure 5:
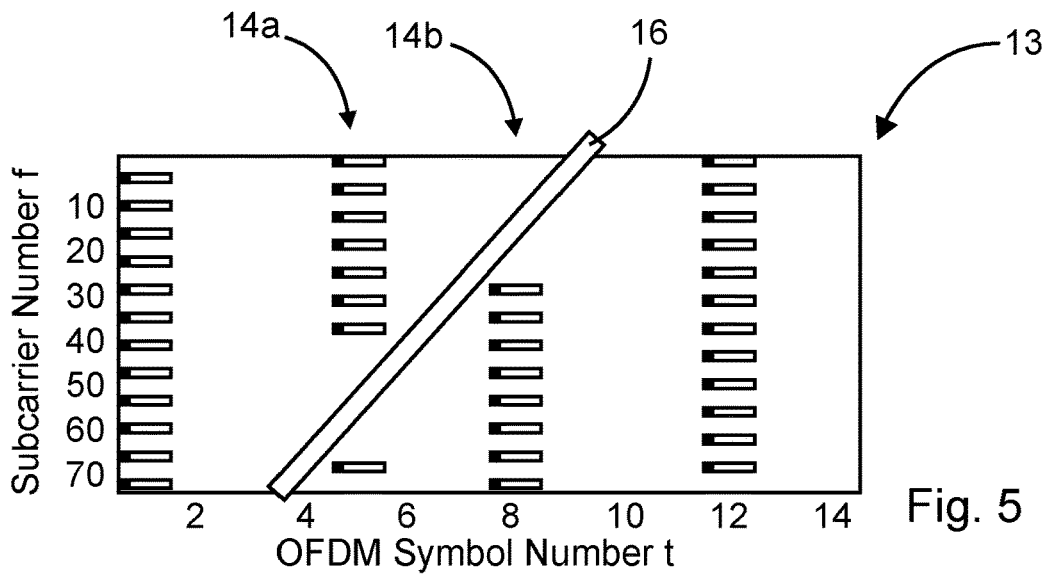
FIG. 5 shows a discard of distorted pilots from a resource grid of the first transmission signal due to interference with the second signal according to an example embodiment.

Different methods are also presented herein to determine the interference-mitigated pilots. For example, FIG. 5 shows a discard of some distorted pilots from the resource grid or the time-frequency domain 13. This means that determining the interference-mitigated pilots includes discarding some of the pilots that are determined to have an extent of distortion above a threshold extent of distortion. In other words, pilots being distorted to a higher extend by the interfering signal 16 are discarded or omitted from further consideration in comparison to pilots being distorted to a lesser extent. Further consideration may constitute the subsequent channel estimation of the corresponding transmission channel. Therefore, all pilot symbols with distortion above a predetermined threshold can be omitted from the channel estimation process. FIG. 5 depicts the resource grid after some strongly distorted pilots have been omitted from the two OFDM-symbols 14a, 14b. In this regard, FIG. 5 shows an example in which pilots being directly interfered or overlapped by the interfering signal 16 in terms of their time-frequency distribution are omitted from channel estimation.

This is a technique to mitigate interference caused by the interfering signal 16, e.g., an FMCW radio altimeter interference, by omitting the interfered pilots from the channel estimation process. For this purpose, two different examples may be considered. The first example is a pilot blanking where the interfered pilot symbols are punctured, and the second example is an OFDM-blanking where one or more complete OFDM-symbol experiencing an interference are omitted. The first example is shown in FIG. 5 while the second example is shown in FIG. 6.

Figure 6:
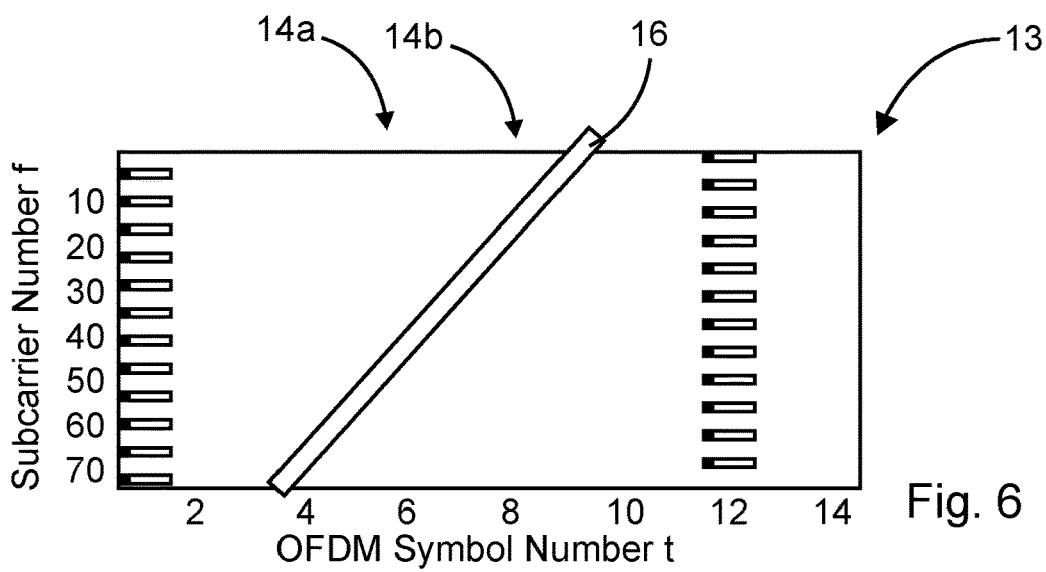
FIG. 6 shows a discard of complete OFDM-symbols from a resource grid of the first transmission signal due to interference with the second signal according to an example embodiment.
Figure 7:
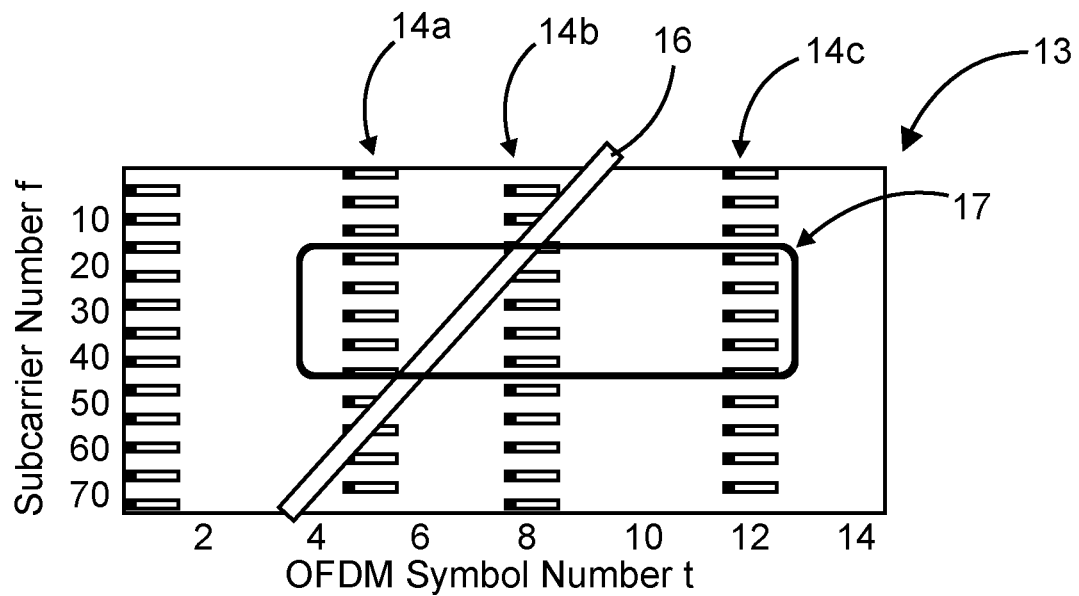
FIG. 7 shows an interference of pilots and neighboring pilots in a resource grid of the first transmission signal due to interference by the second signal according to an example embodiment.

While pilot blanking is omitting only pilots which are directly affected by the interfering signal 16 (cf. FIG. 5), the OFDM-blanking approach omits the complete OFDM-symbols from channel estimation (cf. FIG. 6). In the subsequent channel estimation step the pilots at blanked pilot positions may be interpolated. This can be achieved, for example, by redundant pilots in time or frequency domain or advanced interpolation algorithms based on the sparsity of wireless channels. In general, the channel impulse response of the wireless channel is sparse due to the multipath propagation of the wireless signal. Thus, within the coherence time of the wireless channel the sparse channel impulse response can be exploited by methods of compressed sensing, reducing the number of pilots required for an accurate channel estimation.

In order to determine which pilots are actually distorted and to what extent, the above-described interference measuring techniques may be applied. For example, all pilots can be marked as distorted, if a selected $\epsilon_{t,f}$ is above a given threshold.

With reference to the situation depicted in FIG. 5 showing the pilot blanking, the channel estimation algorithm may use non-blanked pilots surrounding the position of a pilot symbol that is omitted for estimating the channel on the affected data symbols.

With reference to the situation depicted in FIG. 6 showing the OFDM-blanking, all pilots within an OFDM-symbol are omitted from the estimation process, if a single distortion of a pilot in the OFMD-symbol is above a given threshold. FIG. 6 shows a resource grid after pilots are omitted via OFDM-blanking, where the complete OFDM-symbols containing a distorted pilot symbol are blanked/omitted and thus discarded from the channel estimation. Here, the two OFDM-symbols 14a, 14b have been blanked. In the depicted example, the applied estimation algorithm may use non-blanked pilots in OFDM-symbols surrounding the blanked OFDM-symbols 14a, 14b for estimating the channel on the data symbols in these OFDM-symbols.

Determining interference-mitigated pilots may alternatively or additionally also include adapting an influence for each pilot, the adapted influence being indicative of an impact of the respective pilot on estimating the transmission channel of the first transmission signal. A corresponding smoothing approach is visualized in FIG. 7 which shows an interference of pilots and neighboring pilots 17 in a resource grid of the first transmission signal due to interference by the interfering signal 16. Such smoothing approach mitigates the interference by suppressing the impact of interfered pilots on the estimation process in relation to their distortion. While a time smoothing is utilizing only the time domain for mitigation, neighbor smoothing further utilizes the frequency domain.

An assumption for a good performance of the time smoothing approach is low channel variance. This can be accomplished by low velocity of the transmission environment (transmitter, receiver and obstacles). Having a set of pilots at the same frequency locations over the time domain, these pilots can be averaged over time. In general, an assumption may be to perform pilot averaging over time among a small number of OFDM-symbols 14a, 14b, 14c. It is assumed that received pilots are directly reflecting the wireless channel on the corresponding time-frequency position. A pilot may be descrambled before it is used for channel estimation purpose.

A possibility to realize the pilot smoothing is that a selected distortion parameter $\epsilon_{t,f}$ is used to suppress the interfered pilots accordingly. Therefore, the weighted mean or average among time and frequency is applied, such that the pilots are adapted, i.e., smoothed, considering the local SIR estimates. The adapted (smoothed) pilot estimate is obtained with $$\hat{y}_{t,f} = \frac{\sum_{n=T_1}^{T_2} \sum_{k=F_1}^{F_2} \epsilon_{t+n,f+k}^{-1} \cdot \omega_{t+n,f+k} \cdot y_{t+n,f+k}}{\sum_{n=T_1}^{T_2} \sum_{k=F_1}^{F_2} \epsilon_{t+n,f+k}^{-1} \cdot \omega_{t+n,f+k}}.$$

All pilots within time interval $t+T_1$ and $t+T_2$ and within frequency/subcarrier $f+F_1$ and $f+F_2$ are used to adapt the pilot at time t and frequency f and thus to determine the interference-mitigated pilots. Furthermore, a weight $\omega$ depending on time t and frequency f can be applied, to give a higher weight to pilots close to the actual pilot $y_{t,f}$. It is noted that the mean value of all pilots within the time interval $t+T_1$ and $t+T_2$ and within frequency/subcarrier $f+F_1$ and $f+F_2$ is determined if the distortion parameters $\epsilon_{t,f}=1$ and the weights $\omega_{t,f}=1$ for all t, f, where $N_P=(T_2-T_1)\cdot(F_2-F_1)$, is the number of pilots within the time frequency interval above. The following applies:

$$\hat{y}_{t,f} = \frac{\sum_{n=T_1}^{T_2} \sum_{k=F_1}^{F_2} y_{t+n,f+k}}{N_P}.$$

Figure 8:
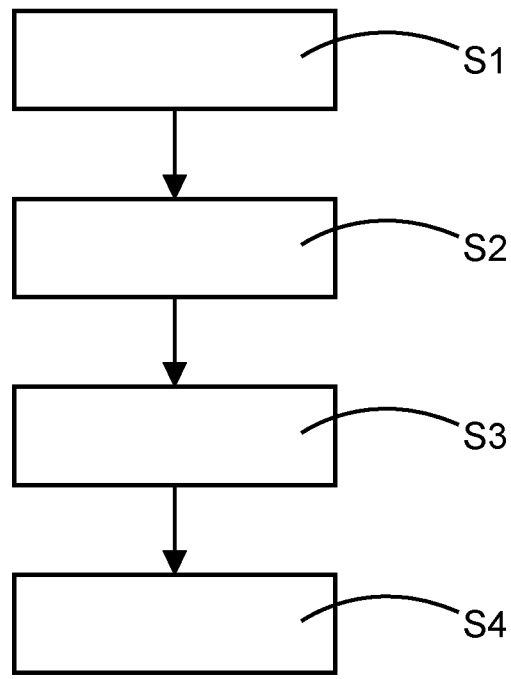
FIG. 8 shows a method for estimating a transmission channel of a communication link according to an example embodiment.

FIG. 8 shows a method for estimating the transmission channel of the communication link 11 shown in FIG. 1. In a step S1 of the method, the first transmission signal 11a including the plurality of data elements and the plurality of pilots 12 (cf. FIG. 2) is received through the transmission channel, wherein each of the plurality of pilots 12 is located at specified locations within a time-frequency domain 13 of the first transmission signal 11a. In a further step S2, a level of interference for each of the plurality of pilots 12 is determined, wherein the level of interference is indicative of an extent of distortion on a respective pilot 12 caused by the second transmission signal 11b interfering with the first transmission signal 11a. In a further step S3, an interference-mitigated pilot for each pilot 12 is determined based on the determined level of interference determined for each respective pilot 12. In a further step S4, the transmission channel of the first transmission signal is estimated using the determined interference-mitigated pilots.

Summarizing the above-described method, it provides an efficient technique to mitigate interference on pilots for scenarios, where interference differs over time and frequency. This is particularly present for interfering FMCW radar systems for which the method can be applied for example.

The inventive method and system locally mitigate concentrated interference, and therefore enhances the channel estimation process required for coherent data transmission. Therefore, throughput and reliability of wireless transmission in e.g., FMCW interference scenarios can be increased. The inventive method and system are particularly applicable in wireless systems operating in scenarios with locally concentrated distortions on a transmission signal, for example in avionic communication since, besides avionic communication also FMCW radio altimeters are operating in the WAIC band at 4.2 to 4.4 GHz and its interference should be mitigated.

The subject matter disclosed herein can be implemented in or with software in combination with hardware and/or firmware. For example, the subject matter described herein can be implemented in or with software executed by a processor or processing unit. In one example implementation, the subject matter described herein can be implemented using a computer readable medium having stored thereon computer executable instructions that when executed by a processor of a computer control the computer to perform steps. Example computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for estimating a transmission channel of a communication link, comprising:
   receiving, through the transmission channel, a first transmission signal including a plurality of data elements and a plurality of pilots, each of the plurality of pilots being located at specified locations within a time-frequency domain of the first transmission signal, wherein the plurality of pilots comprises at least a set of pilots at a common frequency location over a time domain of the time-frequency domain;
   determining a level of interference for each of the plurality of pilots, the level of interference being indicative of an extent of distortion on a respective pilot caused by a second transmission signal that varies over time and frequency interfering with the first transmission signal;
   determining an interference-mitigated pilot for each pilot based on the level of interference determined for each respective pilot; and
   using the interference-mitigated pilot determined for each pilot to estimate the transmission channel of the first transmission signal;
   wherein determining the interference-mitigated pilot for each pilot comprises:
   discarding one or more of the set of pilots that are determined to have an extent of distortion above a threshold extent of distortion; and
   determining interpolated values at positions of the one or more of the set of pilots that are discarded based on remaining ones of the plurality of pilots at the common frequency location.

2. The method of claim 1, wherein the level of interference is indicative of an extent of distortion on a respective pilot caused by the second transmission signal interfering with a portion of the first transmission signal.

3. The method of claim 1, wherein the first transmission signal is based on orthogonal frequency-division multiplexing (OFDM), wherein the first transmission signal comprises multiple OFDM-symbols at respective time steps and multiple OFDM-subcarriers at respective subcarrier frequencies.

4. The method of claim 1, wherein the second transmission signal is a frequency-modulated signal having an instantaneous bandwidth less than a bandwidth of the first transmission signal.

5. The method of claim 1, wherein the second transmission signal is a chirp signal.

6. The method of claim 1, wherein determining the level of interference for each of the plurality of pilots includes determining an amplitude and a phase of the first transmission signal.

7. The method of claim 1, wherein determining the level of interference for each of the plurality of pilots includes:
   obtaining an estimation parameter for the transmission channel;
   determining a distortion for each pilot in the first transmission signal; and
   determining a deviation value for each pilot based on the estimation parameter and the distortion determined for each pilot.

8. The method of claim 3, wherein determining the interference-mitigated pilots includes discarding all pilots of those OFDM-symbols that include at least one pilot determined to have an extent of distortion above a threshold extent of distortion.

9. The method of claim 1, wherein determining the interference-mitigated pilots includes adapting an influence for each pilot, the adapted influence being indicative of an impact of the respective pilot on estimating the transmission channel of the first transmission signal.

10. A system for estimating a transmission channel of a communication link, comprising:
    a transmitter configured to transmit a first transmission signal;
    a receiver configured to receive the first transmission signal through the transmission channel;
    wherein the first transmission signal includes a plurality of data elements and a plurality of pilots, each of the plurality of pilots being located at specified locations within a time-frequency domain of the first transmission signal;
    wherein the receiver is configured to determine a level of interference for each of the plurality of pilots, the level of interference being indicative of an extent of distortion on a respective pilot caused by a second transmission signal that varies over time and frequency interfering with the first transmission signal, wherein the plurality of pilots comprises at least a set of pilots at a common frequency location over a time domain of the time-frequency domain;

wherein the receiver is configured to determine an interference-mitigated pilot for each pilot based on the level of interference determined for each respective pilot;
wherein the receiver is configured to determine the interference-mitigated pilot for each pilot by:
  discarding one or more of the set of pilots that are determined to have an extent of distortion above a threshold extent of distortion; and
  determining interpolated values at positions of the one or more of the set of pilots that are discarded based on remaining ones of the plurality of pilots at the common frequency location; and
wherein the receiver is configured to use the determined interference-mitigated pilots to estimate the transmission channel of the first transmission signal.

* * * * *